United States Patent
Azenkot

(10) Patent No.: US 10,608,848 B1
(45) Date of Patent: Mar. 31, 2020

(54) CTLE ADAPTATION BASED ON POST-CURSORS

(71) Applicant: MACOM Technology Solutions Holding, Inc., Lowell, MA (US)

(72) Inventor: Yehuda Azenkot, San Jose, CA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 0 days.

(21) Appl. No.: 16/152,217

(22) Filed: Oct. 4, 2018

(51) Int. Cl.
*H04L 25/03* (2006.01)
(52) U.S. Cl.
CPC .................... *H04L 25/03885* (2013.01)
(58) Field of Classification Search
CPC .............................................. H04L 25/03885
See application file for complete search history.

(56) References Cited

U.S. PATENT DOCUMENTS

| | | | |
|---|---|---|---|
| 9,313,017 B1* | 4/2016 | Liao | H04L 7/0087 |
| 2012/0076181 A1* | 3/2012 | Aziz | H04L 25/03057 |
| | | | 375/219 |

* cited by examiner

*Primary Examiner* — Kabir A Timory

(57) ABSTRACT

An adaptive CTLE used in a receiver with its zero and/or pole frequencies automatically and continuously adjustable based on an error signal and post-cursors. The error signal is derived from the sliced equalized signal that is output from the CTLE. A correction control signal can be determined based on one or more delayed and sampled data (corresponding to the post-cursors) and the error signal. As controlled by the correction control signal, the CTLE zero/pole frequency setting is then adapted such that the CTLE transfer function causes the error signal to decrease while the post cursor ISI is reduced or eliminated. As a result, effective equalization can be advantageously accomplished in a consistent and fast manner.

18 Claims, 7 Drawing Sheets

CTLE ADAPTATION BASED ON POST-CURSORS

TECHNICAL FIELD

The present disclosure relates generally to the field of signal processing in communications and, more specifically, to the field of continuous time linear equalization mechanisms in signal processing.

BACKGROUND OF THE INVENTION

In communications systems, a transmitter sends data streams to a receiver in symbols, such as bits of data. During data transmission, the data signal is usually distorted in terms of phase and amplitude due to various types of noise, such as fading, oscillator drift, frequency and phase offset, and receiver thermal noise. Signal degradation in high-speed data links can be mitigated by means of channel equalization. Continuous Time Linear Equalization is a common equalization technique to compensate the effects of a channel's transfer function (s-domain), particularly by flattening the frequency response within the frequency range of interest and removing Inter-Symbol Interference (ISI) caused by pre-cursors and post-cursors. As a transmission channel usually acts like a low-pass filter as it attenuates high frequency signal contents, a Continuous Time Linear Equalizer (CTLE) is designed to filter a received input signal by either boosting the high frequency content or attenuating the low frequency contents in the received signal.

A CTLE circuit can be implemented by using resistors, transistors, inductor, and/or capacitors. A typical CTLE transfer function exhibits one zero frequency and two pole frequencies as can be represented by a Bode Plot. The transfer function can be adjusted by varying the zero and/or pole frequency which can be achieved by changing electrical properties of the circuitry components in the CTLE. For example, the zero frequency location can be tuned by changing the voltage of a varactor. Placements of the zero and pole frequencies should be tailored to the channel characteristics to provide efficient channel equalization. Generally, when the zero frequency shifts to a lower frequency, the CTLE frequency response is augmented which corresponds to a higher gain for a given frequency in the interested band; and when the zero frequency shifts to a higher frequency, the CTLE frequency response is reduced which corresponds to a lower gain at a given frequency.

Conventionally, an optimal setting of a zero or pole frequency is obtained by scanning the numerous possible settings and selecting one that yields the best performance as evaluated based on Signal-Noise Ratio or Bit-Error Rate (BER) in the equalized signal. This trial-and-error approach takes a long time to converge and is not adaptive to channel changes over the time.

SUMMARY OF THE INVENTION

Accordingly, embodiments of the invention are directed to continuous time linear equalization methods and systems capable of dynamically and efficiently adapting the zero and/or pole frequency placement to time-variant channel characteristics of a communication channel.

Embodiments of the present disclosure provide a receiver including Continuous Time Linear Equalizer (CTLE) control logic that can continuously generate a correction control signal to dynamically adapt the zero and/or pole frequency based on an error signal and post-cursor Intersymbol Interference (ISI). More specifically, an equalized signal output from the CTLE is sliced by a slicer according to a modulation scheme of the received signal. An error signal is generated based on the difference between the slicer output and the slicer input. In some embodiments, the difference may be further sliced to generate the error signal. The output of the CTLE is sampled, and stored (therefore delayed) in registers. A correction step signal is calculated based on one or more selected delayed data samples and the error signal, and then added with a stored correction control signal to generate an updated correction control signal. The updated correction control signal is then used to adjust the pertinent components in the CTLE to shift the zero/pole frequency, and thereby adjust the CTLE transfer function, to a direction that in turn leads to a smaller error in the equalized signal which indicates reduced post-cursor ISI.

In some embodiments, the receiver includes a digital Decision Feedback Equalizer (DFE) coupled downstream of the slicer and the CTLE. The registers built-in the DFE are capable of store a sequence of sampled data to produce a set of delayed data samples used for generating DFE Finite Impulse Response (FIR) filter taps according to a least-mean-square (LMS) algorithm. The set of delayed data samples can be reused as post-cursors by the CTLE control logic to generate a correction control signal.

In some embodiments, a single delayed sample (e.g., corresponding to a particular DFE FIR tap) is selected and multiplied with a gain factor and the error signal to produce a correction step signal. A correction control signal is then generated by correction step signal to adjust the CTLE zero/pole frequency. The resultant adjustment can advantageously reduce or cancel the ISI contributed by the selected post-cursor.

In some other embodiments, a set of delayed samples are alternately selected to generate a correction step signal, e.g., one for each update cycle. Thus, an update of the correction control signal is obtained by selecting a correction step signal different than the previous update. For example, the selections can be performed in a Round Robin order. In this manner, the adaptation of the CTLE is collectively based on a number of post-cursors rather than just one. Each selected post-cursor may be associated with a respective gain factor depending on its post-cursor interference contribution.

In still some other embodiments, the adaptation of the CTLE is based on a set of post-cursors in combination, which allows an optimal setting to be achieved in a fast speed. Each post-cursor is multiplied with a respective gain factor and the error signal to generate a correction step signal. Each update of the correction control signal can be obtained by summing all the correction step signals. The gain factors may be programmable based on the ISI contributed by the corresponding post-cursors.

According to embodiments of the present disclosure, a CTLE transfer function can be dynamically and continuously adapted to time-variant channel characteristics based on a slicer error in the equalized signal output from the CTLE and further based on one or more selected post-cursors. The adapted CTLE function can advantageously reduce or eliminate ISI ascribed to the one or more selected post-cursors. The adaptation speed can be flexibly controlled by the appropriate selections of the post-cursors and the associated gain factors.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

BRIEF DESCRIPTION OF THE DRAWINGS

Embodiments of the present invention will be better understood from a reading of the following detailed description, taken in conjunction with the accompanying figures, in which like reference characters designate like elements.

CTLE ADAPTATION BASED ON POST-CURSORS

Embodiments of the present invention provide an adaptive CTLE with its zero and/or pole frequencies automatically and continuously adjustable based on an error signal and post-cursors. The error signal is derived from the sliced equalized signal that is output from the CTLE. A correction control signal can be determined based on one or more delayed and sampled data (corresponding to the post-cursors) and the error signal. As controlled by the correction control signal, the CTLE zero/pole frequency setting is then adapted such that the CTLE transfer function causes the error signal to decrease while the post cursor ISI is reduced or eliminated. As a result, effective equalization can be advantageously accomplished in a consistent and fast manner.

Figure 1:
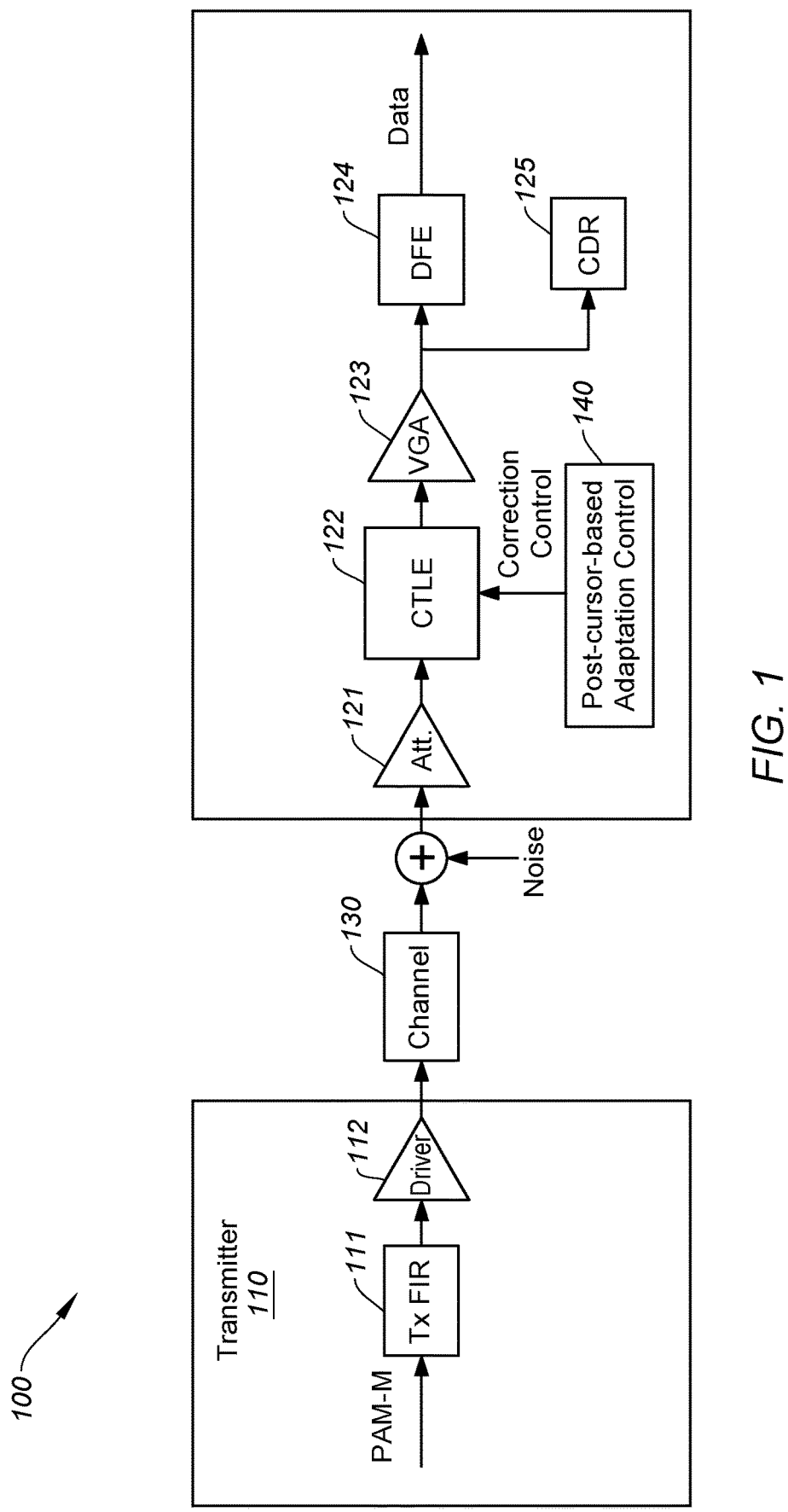
FIG. 1 illustrates the configuration of a data communication system that includes an exemplary receiver including CTLE control logic capable of adjusting a CTLE zero and/or pole frequency based on a slicer error and post-cursors in accordance with an embodiment of the present disclosure.

FIG. 1 illustrates the configuration of a data communication system 100 that includes an exemplary receiver 120 including CTLE control logic capable of adjusting a CTLE zero and/or pole frequency based on a slicer error and post-cursors in accordance with an embodiment of the present disclosure. In a simplified form, the system 100 includes a transmitter 110, a data transmission channel 130 and the receiver 120. On the transmitter 110 side, the signal is modulated according to a certain modulation scheme, e.g., Pulse Amplitude Modulation (PAM)-M. The transmitter Finite Impulse Response (Tx FIR) filter 111 receives the modulated signal and pre-distorts the transmitted pulses to invert channel distortion at the cost of attenuating or deemphasizing the signal. The filtered signal is sent to the driver 112 which drives the signal for transmission through and channel 130, e.g., primarily composed of an optical fiber cable 130. During transmission, various types of noise and distortion may be undesirably introduced to the signal.

The receiver 120 may include a photo detector and a transimpedance amplifier and operates to receive data from the channel 130. The received signal is attenuated by a voltage gain amplifier (or attenuator) 121 and sent to the CTLE 122. The main functionality of the CTLE 122 is to equalize the effect of the channel, which involves flattening the frequency response within the frequency band of interest. In the time domain, this translates to removing Intersymbol Interference (ISI) attributed to pre-cursors and post-cursors.

According to embodiments of the present disclosure, the CTLE 122 is adaptive and is coupled to the post-cursor-based adaptation control logic 140 configured to generate a correction control signal based on current channel characteristics, for example as indicated by a slicer error in the output signal of the CTLE. The correction control signal is generated further based on one or more selected post-cursors which are estimated to cause significant ISI. The correction control signal is supplied to the CTLE and used to adjust the location of its zero frequency and/or a pole frequency to the effect of reducing the equalization error. As the correction control signal is generated based on the slicer error which indicates the current channel characteristics, the CTLE transfer function is advantageously adapted to the current channel characteristics by virtue of zero frequency or pole frequency adjustment. Further, the correction control signal factors in one or more selected post-cursors, the ISI caused by these post-cursors can be selectively and efficiently reduced or eliminated.

The present disclosure is not limited to any particular type of frequency response implemented in the CTLE. Nor is it limited to any specific structures, logic, circuits or designs used to implement the CTLE. Rather, the CTLE 122 may be implemented in any configuration that is well known in the art without departing from the scope of the present disclosure. For example, the CTLE 122 may be composed of a bank of resistors, capacitors, transistors, and etc. The CTLE 122 may be an active or passive CTLE, and may exhibit one zero and two poles in the frequency domain. In some embodiments, the location of the CTLE zero frequency or a pole frequency in its transfer function can be varied by the voltage of a varactor. As the varactor dictates an analog voltage control, a digital word derived from the correction control signal can be converted to an analog voltage for supply to the varactor through digital-analog-conversion (DAC). In some other embodiments, the CTLE zero/pole frequency and so its transfer function may be adjusted by using a digital word derived from the correction control signal to directly control an array of resistors and capacitor.

The CTLE 122 is coupled to a voltage gain amplifier 123 and a decision feedback equalizer (DFE) 124 used to further equalize the signal. The VGA 123 output is sent to a clock-data recovery (CDR) module 125 as well as other downstream processing modules for further processing. Since a CTLE according to embodiments of the present disclosure can be adapted to time-variant channel characteristics and effectively reduce or eliminate post-cursor ISI, the task of post-cursor ISI cancellation, which is conventionally and primarily performed by a DFE, can be offloaded to the CTLE. Therefore, in some other embodiments, a receiver equipped with an adaptive CTLE according to embodiments of the present disclosure may advantageously not need a DFE.

In the embodiments described herein in detail, a DFE is used for channel equalization in conjunction with an adaptive CTLE. The DFE is built in with logic to store post-cursors taps which correspond to a set of delaying sampled data. The delayed sampled data are used to generate DFE Finite Impulse Response (FIR) filter taps according to a least-mean-square (LMS) algorithm. The set of delayed data samples are reused as a set of post-cursors to generate a correction control signal. However, this discussion is merely exemplary, and the present disclosure is not limited thereto. In some other embodiments, delayed sampled data used by the CTLE control logic may be generated independent of a DFE.

Figure 2A:
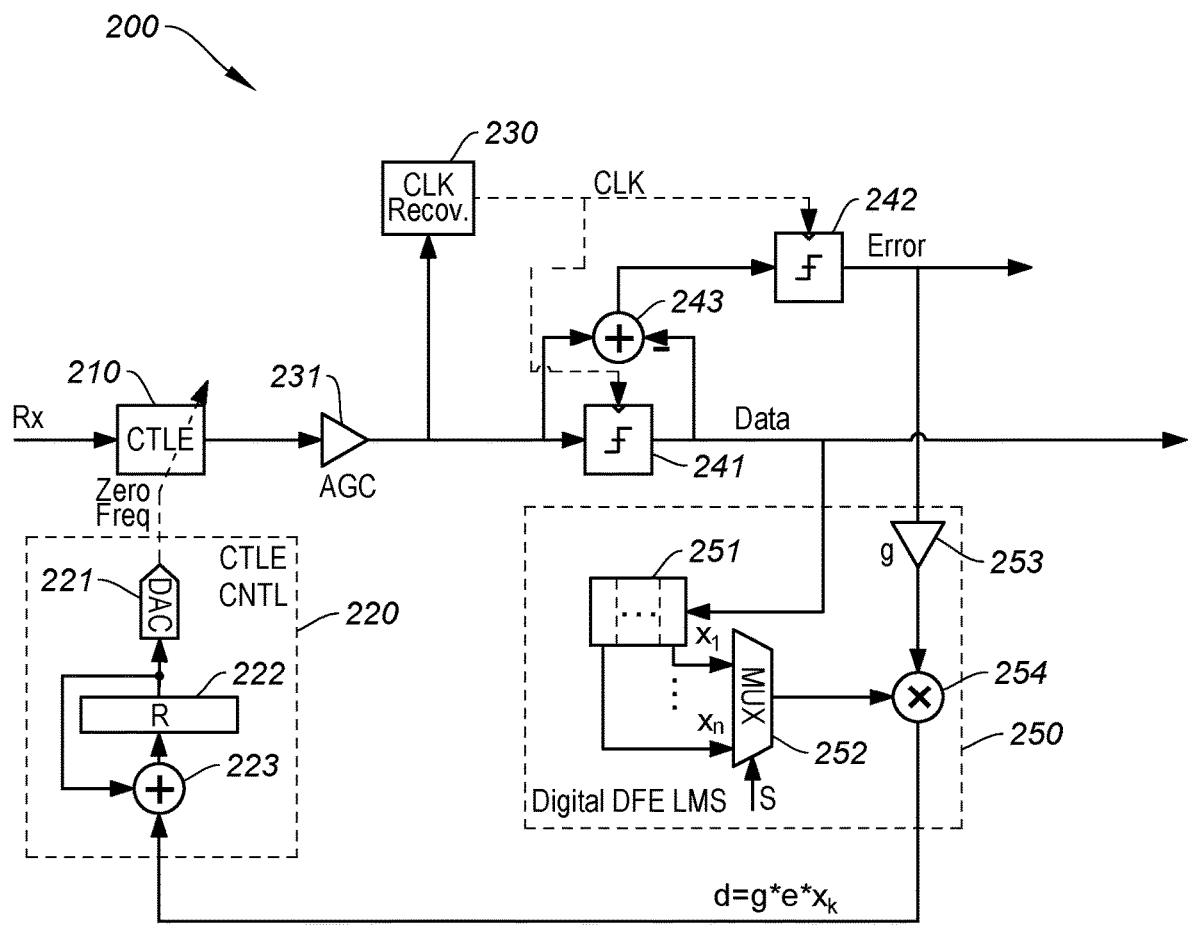
FIG. 2A illustrates the configuration of a receiver including CTLE control logic operable to generate a correction control signal to adapt the CTLE based on post-cursors in accordance with an embodiment of the present disclosure.

FIG. 2A illustrates the configuration of a receiver 200 including CTLE control logic 220 operable to generate a correction control signal to adapt the CTLE based on post-cursors in accordance with an embodiment of the present disclosure. The receiver 200 includes a CTLE circuit 210 coupled to CTLE control logic 220, an automatic gain controller (AGC) 231, a clock recovery module 230, slicers 241 and 242 and a digital DFE least-mean-square (LMS) filter 250.

During operation, the CTLE 210 receives an input signal Rx and output an equalized signal. The AGC 231 adjusts the gain level of the equalized signal and outputs the signal with suitable signal amplitudes. The output of the AGC 231 is sent to the clock recovery module 230 to generate a recovered clock signal "CLK" as well as to the slicer 241. The slicer 241 slices the signal to generate data samples according to the modulation scheme used at the transmitter side. For example, for a signal modulated by PAM-2, the slicer 241 slices its input signal into two levels, usually denoted as "+1" and "−1." The adder 243 outputs an error signal based on a difference between the slicer input and the slicer output. The error signal is further sliced by the error slicer 242 into two levels. In some other embodiments, no error slicer is used and the full or partial resolution of the error signal is used.

In the illustrated embodiment, a correction step signal is generated by multiplying the sliced error signal with a selected delayed data sample as supplied from the DEF LMS 250. The DFE LMS 250 includes the registers 251 storing the post-cursors, an amplifier 253 with a gain factor of g, and a multiplier 254. As shown, the sliced data samples are supplied to the DFE LMS 250 for generating DFE FIR taps in combination with tap parameters. The most recent n post-cursors are stored in the registers 251 as $x_1, \ldots, x_n$. Assuming $x_0$ is the current data sample being processed by the CTLE, the n taps correspond to its post-cursors, with $x_1$ being the first post-cursor.

As controlled by a selection signal "S," the multiplexer (MUX) 252 outputs a selected post-cursor. The sliced error is amplified by the amplifier 253 and then multiplied with the selected post-cursor to generate the correction step signal d, e.g., $$d = g \times e \times x_k$$

where g is a programmable gain, e is the slicer error and $x_k$ is the sampled sliced delayed data selected via the MUX 252.

In some embodiments, to simplify the implementation of the programmable gain, g can be generated according to $$g = 2^{-m}$$

where m is a programmable positive integer, such as 1, 2, 3, . . . . In this case, a shifter can be used, which is much simpler to implement than a multiplier.

The particular delayed sliced data $x_k$ is selected to cancel its attribution to post-cursor ISI in the signal. For example, if k=1 is selected, the CTLE is adapted to cancel the effect of the first post-cursor; if k=2 is selected, the CTLE is adapted to cancel the effect of the second post-cursor, and etc.

The CTLE control logic 220 includes a register R 222 for storing the most recent correction control signal. The correction step signal d is summed (223) with the value in the register 222 and then converted to an analog signal by the digital-analog-converter 221. The register 222 is updated with the summed signal. The analog signal is used as the correction control signal to control the varactor voltage of the CTLE 210 or to control directly a set of transistor switches which select capacitors and/or resistors that set the zero frequency or a pole frequency. The resolution of the DAC 221 may be 6 to 8 bits. In order to prevent a large effect on the data in the tracking mode, a higher DAC resolution may be used. In a different embodiment, the control logic 220 does not include a DAC and the register 222 controls an array of resistors and capacitors that set the CTLE transfer function.

Figure 2B:
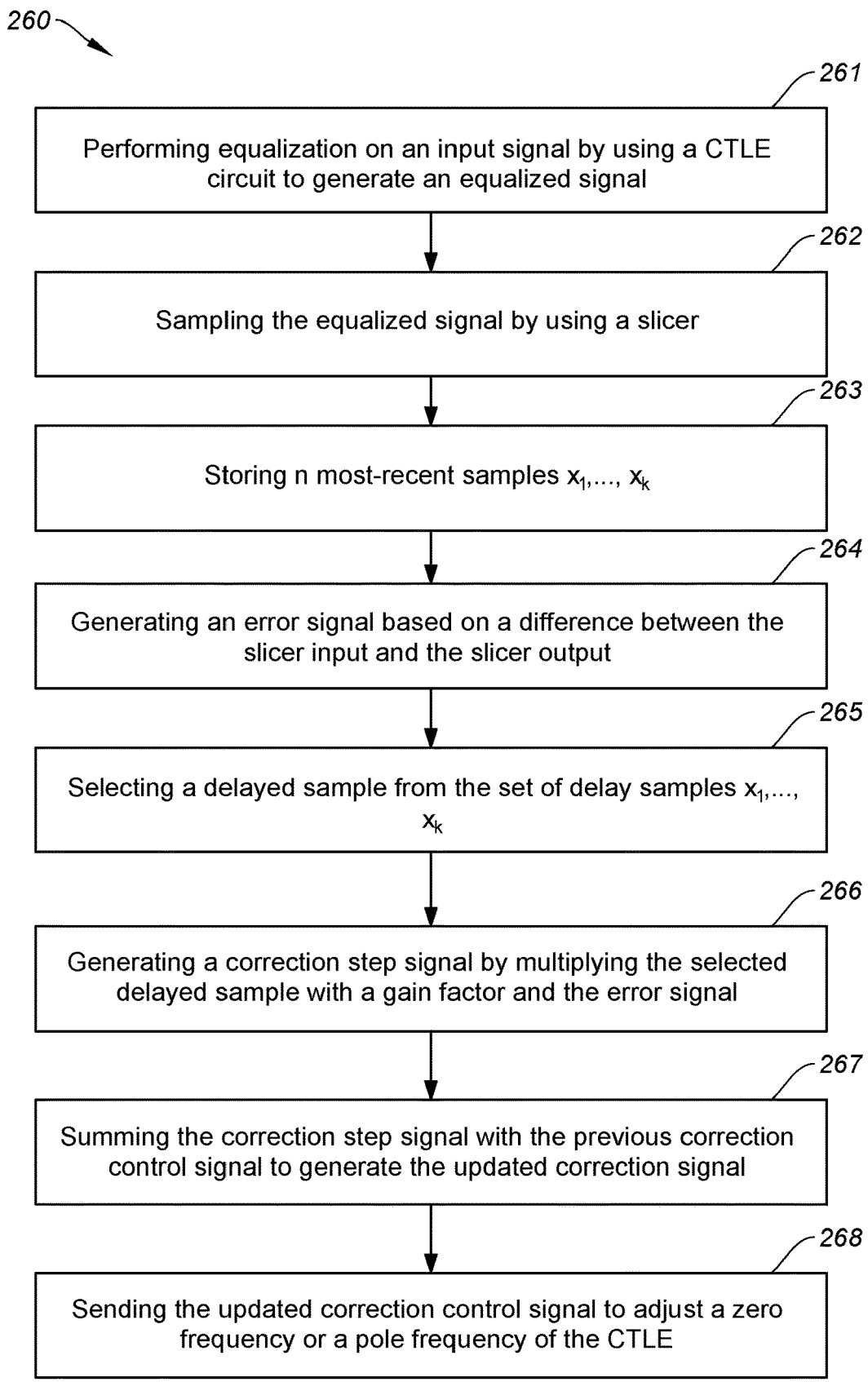
FIG. 2B is a flow chart depicting an exemplary process of adapting a zero/pole frequency in a CTLE in accordance with an embodiment of the present disclosure.

FIG. 2B is a flow chart depicting an exemplary process 260 of adapting a zero/pole frequency in a CTLE in accordance with an embodiment of the present disclosure. It will be appreciated that the present disclosure is not limited to any specific circuitry or logic configuration that can implement the process 260. For example, process 260 may be performed by the receiver 200.

At 261, continuous time linear equalization is performed on a signal input to a CTLE circuit and an equalized signal is output. At 262, the equalized signal is sampled or sliced, e.g., by a slicer. At 263, a sequence of n sampled data $x_1, \ldots, x_n$ are stored in registers and in effect delayed as post-cursors with reference to the current data sample $x_0$. At 264, an error signal is generated based on a difference between the slicer input and slicer output. In some embodiments, the error signal may be further sliced and used to generate a correction step signal as follows.

At 265, a delayed data sample $x_k$ is selected from the set of n data samples. At 266, a correction step signal is generated by multiplying the selected delayed sample $x_k$ with a gain factor and the error signal. At 267, the correction step signal is summed with the previous correction control signal to generate an updated correction signal, which is supplied to the CTLE to adjust corresponding components therein and thereby adjust the zero frequency or a pole frequency setting at 268. The foregoing process 261~268 is repeated for continuous adaptation of the CTLE zero frequency or pole frequency.

Figure 3A:
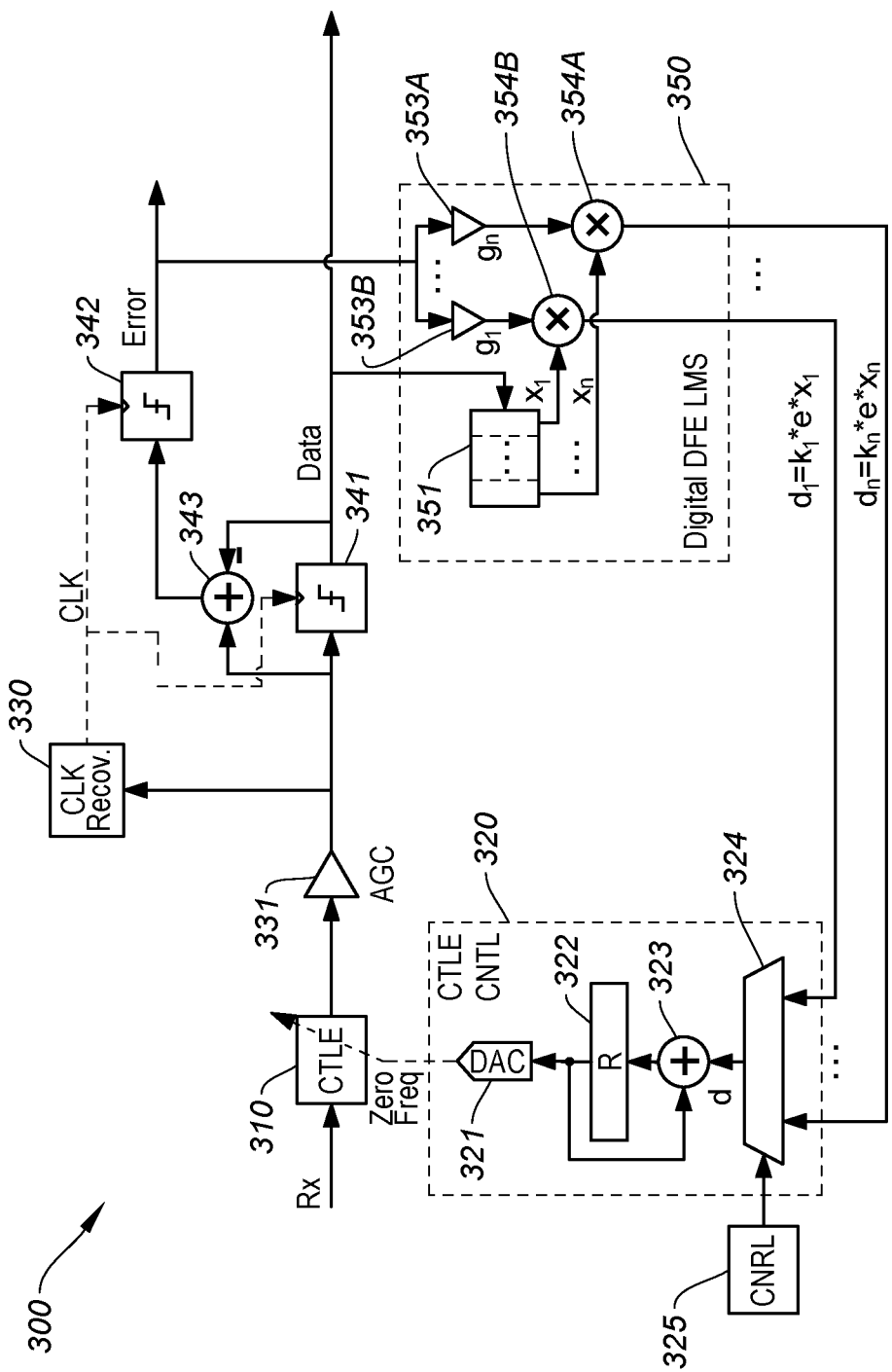
FIG. 3A illustrates the configuration of a receiver including CTLE control logic operable to generate a correction control signal based on alternately selected post-cursors to adapt the CTLE in accordance with another embodiment of the present disclosure.

FIG. 3A illustrates the configuration of a receiver 300 including CTLE control logic 320 operable to generate a correction control signal based on alternately selected post-cursors to adapt the CTLE in accordance with another embodiment of the present disclosure. The receiver 300 includes a CTLE circuit 310 coupled to CTLE control logic 320, an AGC 331, a clock recovery module 330, slicers 341 and 342 and a DFE LMS 350.

During operation, the CTLE 310 receives an input signal Rx and outputs an equalized signal. The AGC 331 adjusts the gain level of the equalized signal and outputs the signal with suitable signal amplitude. The output of the AGC 331 is sent to the clock recovery module 330 to generate a recovered clock signal "CLK" as well as to the slicer 341. The slicer 341 slices the signal to generate data samples according to the modulation scheme used at the transmitter side. A sequence of n data samples $x_1, \ldots, x_n$ are stored in the registers 351 and correspond to the n post-cursor taps with reference to the current data sample $x_0$. The adder 343 outputs an error signal based on a difference between the slicer input and the slicer output. The error signal is further sliced by the error slicer 342 into two levels. In some other embodiments, there is no error slicer and the full or partial resolution of the error signal is used.

In this embodiment, the CTLE adaptation is based on a number of post-cursors in combination rather than just one post-cursor. More specifically, a set of correction step signals $d_1, \ldots, d_n$ are generated, each corresponding to a delayed sample representing a post-cursor. In each processing cycle, one of the correction step signals signal is selected to generate the correction control signal. The selection may be performed according to a predetermined order. For example, each update of the correction control signal is obtained by selecting a different correction step signal, e.g., in a Round Robin manner. However, this discussion is merely exemplary, and the selection can be performed in any other suitable manner without departing from the scope of the present disclosure.

The DFE LMS 350 includes registers 351 storing the FIR post-cursor $x_1, \ldots, x_n$ corresponding to n sliced data samples, the amplifiers 353A-353B set to respective gain factors $g_1, \ldots, g_n$, and multipliers 354A-354B. The sliced error signal is amplified by the amplifiers 353A-353B by respective gain factors $g_1, \ldots, g_n$ and then multiplied with the set of post-cursors $x_n, \ldots, x_n$ by the multipliers 354A-354B. As a result, a set of correction step signals $d_1, \ldots, d_n$ are generated, for example $d_1=g_1 \times e \times x_1$ and $d_n=g_n \times e \times x_n$. In some embodiments, to simplify the implantation of the programmable gain, each gain factor $g_i$ ($i=1, \ldots n$) can be implemented via $$g_i = 2^{-m}$$

where m is a programmable positive integer, such as 1, 2, 3, . . . . In this case, a shifter can be used, which is much simpler to implement than a multiplier.

The multiplexer (MUX) 324 alternately outputs a selected correction step signal $d_k$ by the control of the selection signal "S." The selection signal "S" is generated by a selection control circuit 325 according to a predetermined selection order, e.g., a Round Robin order.

The CTLE control logic 320 includes a register R 322 for storing the last updated correction control signal. For each update cycle, the selected correction step signal $d_k$ is summed with the value in the register 322 and then converted to an analog signal by the digital-analog-converter 321. The register 322 is updated with the summed signal. The analog signal is used as the correction control signal to control the varactor voltage of the CTLE 310 or to control directly a set of transistor switches which select capacitors and/or resistors that set the zero frequency or a pole frequency. The resolution of the DAC 321 may be 6 to 8 bits. In order to prevent a large effect on the data in the tracking mode, a higher DAC resolution may be used. In a different embodiment, the control logic 320 does not include a DAC and the output from the register 322 directly controls an array of resistors and capacitors that set the CTLE transfer function.

By adapting the CTLE based on the set of n post-cursor taps alternately, the ISI ascribed to multiple post-cursors can be attenuated simultaneously. As the CTLE adaptation may be more influenced or impacted by certain post-cursors, in some embodiments, relatively large gain factors can be set for these post-cursors. For example, if the ISI of the first post-cursor $x_1$ is expected to be the largest, and the gain factor $g_1$ may be set to be the larger than any other $g_i$. In a different embodiment, instead of selecting all the correction step signals in equal opportunity as in a simple Round Robin for example, the selection control logic 325 can signal the MUX 324 to select a particular correction step more frequently than others. On the other hand, if the ISI caused by a particular post-cursor $x_i$ is negligible, the corresponding gain factor $g_i$ can be set to zero to deactivate the ISI attenuation effect. Alternatively, the selection control logic 325 can signal the MUX 324 not to select the correction step signal $d_i$ associated with $x_i$.

Figure 3B:
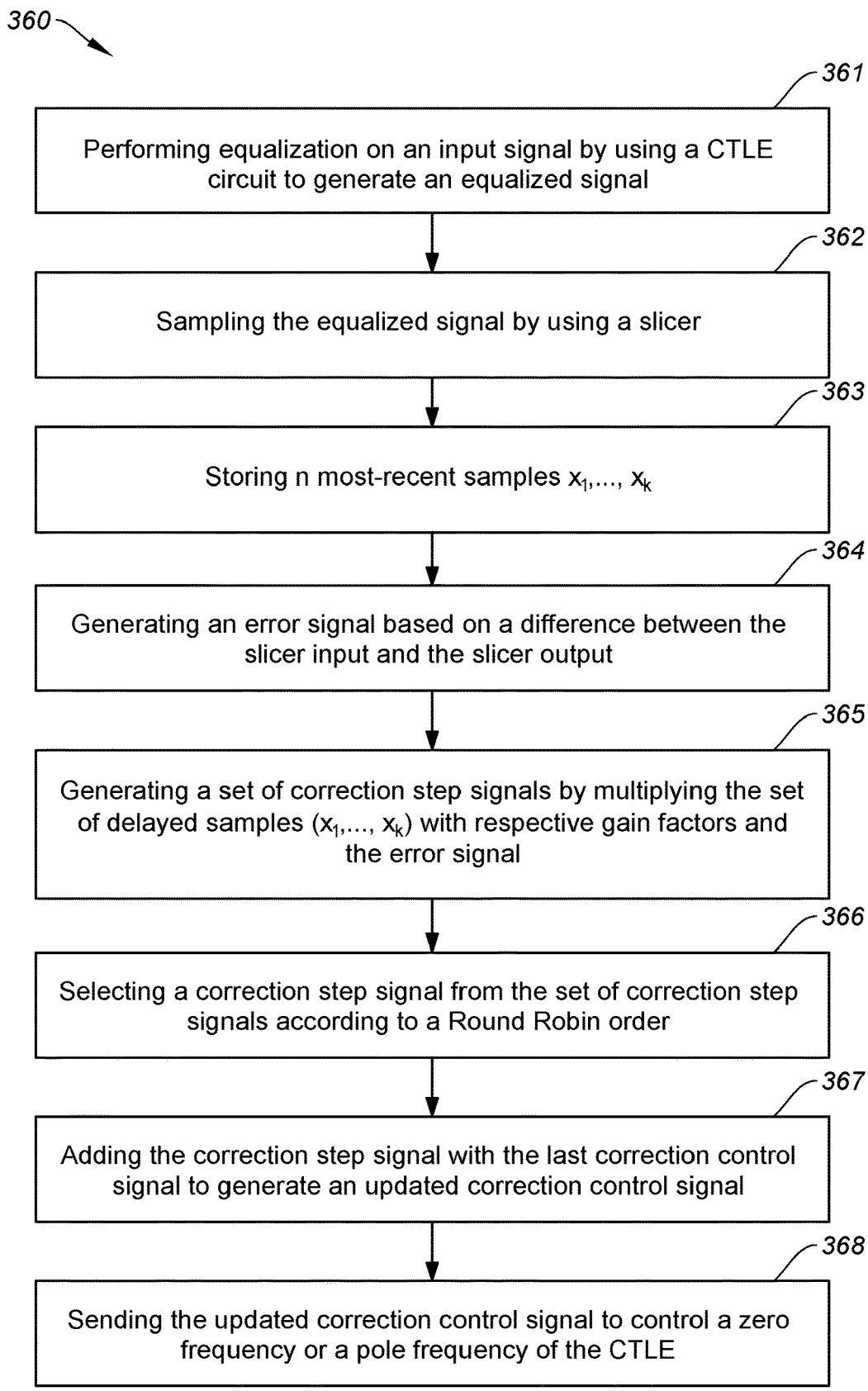
FIG. 3B is a flow chart depicting an exemplary process of adjusting a zero/pole frequency setting in an adaptive CTLE in accordance with another embodiment of the present disclosure.

FIG. 3B is a flow chart depicting an exemplary process 360 of adjusting a zero/pole frequency setting in an adaptive CTLE in accordance with another embodiment of the present disclosure. It will be appreciated that the present disclosure is not limited to any specific circuitry or logic configuration that can implement the process 360. For example, process 360 may be performed by the receiver 300 in FIG. 3A.

At 361, continuous time linear equalization is performed on a signal input to a CTLE circuit and an equalized signal is output. At 362, the equalized signal is sampled, e.g., by a slicer. At 263, a sequence of n sampled data $x_1, \ldots, x_n$ are stored in registers and in effect delayed as post-cursors with reference to the current data sample $x_0$. At 364, an error signal is generated based on a difference between the slicer input and slicer output. In some embodiments, the error signal may optionally be further sliced and used to generate correction control signal as follows.

At 365, a set of correction step signals are generated by multiplying the set of delayed sampled data $x_1, \ldots, x_n$ with the respective gain factors and the error signal. The gain factors may have different magnitudes and some may be set to zero. At 366, a correction step signal is selected from the set of correction step signals, e.g., according to a prescribed order or a random order. At 367, the correction step signal is summed with the last correction control signal to generate an updated correction signal, which is supplied to the CTLE to adjust corresponding components therein and thereby adjust the zero frequency or a pole frequency setting at 368. The foregoing process 361~368 is repeated for continuous adaptation of the CTLE zero frequency or pole frequency.

Figure 4A:
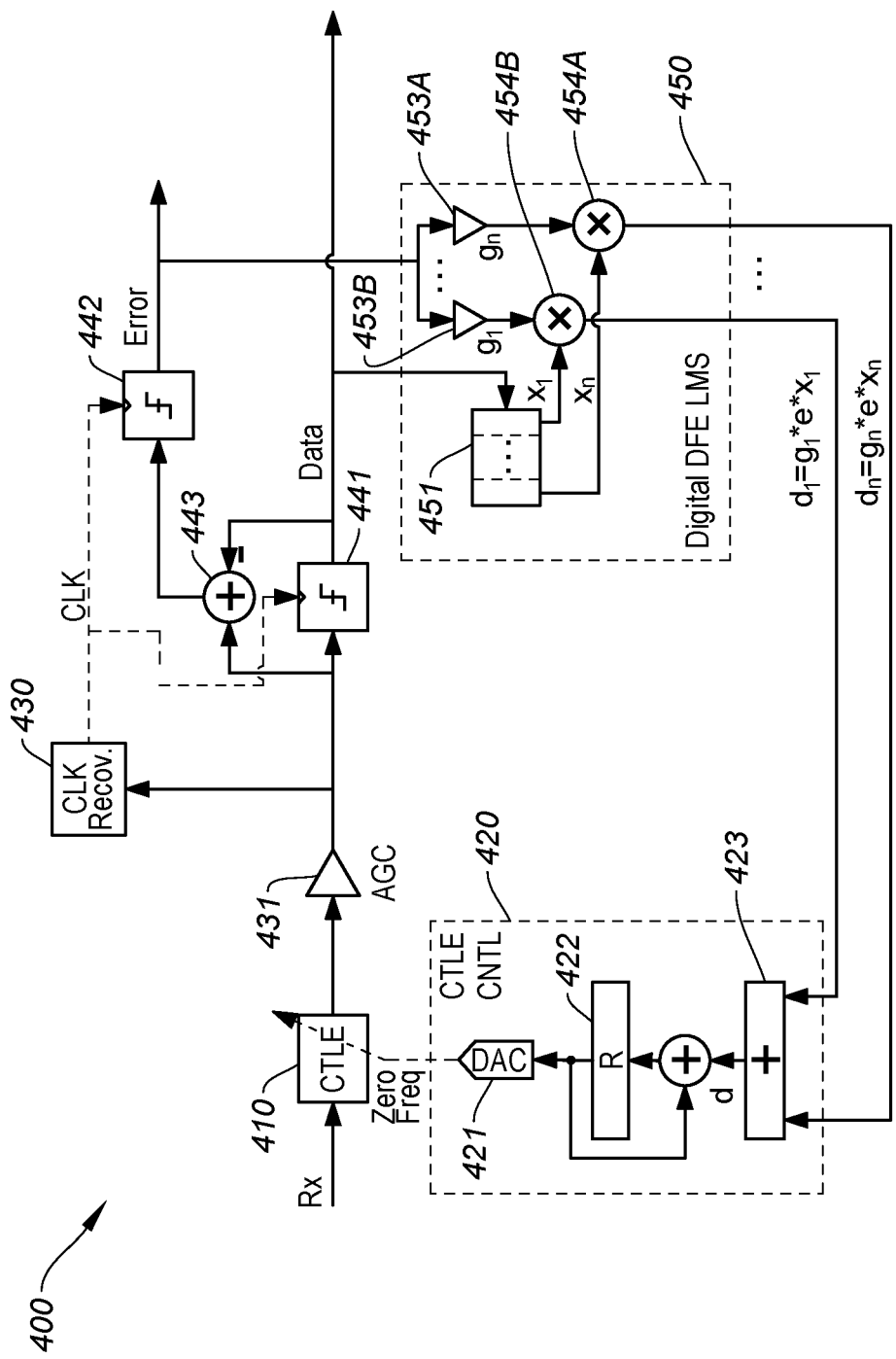
FIG. 4A illustrates the configuration of a receiver including CTLE control logic operable to generate a correction control signal based on a combination of post-cursors to adapt the CTLE in accordance with another embodiment of the present disclosure.

FIG. 4A illustrates the configuration of a receiver 400 including CTLE control logic 420 operable to generate a correction control signal based on a combination of post-cursors to adapt the CTLE in accordance with another embodiment of the present disclosure. The receiver 400 includes a CTLE circuit 410 coupled to CTLE control logic 420, an ACG 431, a clock recovery module 440, slicers 441 and 442 and a DFE LMS 450.

During operation, the CTLE 410 receives an input signal Rx and output an equalized signal. The AGC 431 adjusts the gain level of the equalized signal and outputs the signal with suitable signal amplitudes. The output of the AGC 431 is sent to the clock recovery module 440 to generate a recovered clock signal "CLK" as well as to the slicer 441. The slicer 441 slices the signal to generate data samples according to the modulation scheme used at the transmitter side. A sequence of n data samples $x_1, \ldots, x_n$ are stored in the registers 451 and correspond to the n post-cursor taps with reference to the current data sample $x_0$. The adder 443 outputs an error signal based on a subtraction between the slicer input and the slicer output. The error signal is further sliced by the error slicer 442. In some other embodiments, there is no error slicer and the full or partial resolution of the error signal is used.

In this embodiment, the CTLE adaptation is based on a number of post-cursor taps in combination and simultaneously. More specifically, a set of correction step signals $d_1, \ldots, d_n$ are generated, each corresponding to a delayed sample or a post-cursor tap. In each update cycle, an update of the correction control signal is obtained based on the set of correction step signals, e.g., by summing all the correction step signals. In this manner, the CTLE adaptation can be achieve in a faster speed than the embodiments described with reference to FIGS. 3A and 3B. It will be appreciated that a correction control signal can be generated by using any suitable operation to combine the set of correction step signal without departing from the scope of the present disclosure. As the CTLE can be more affected by certain post-cursor taps, the associated gain factors can be set to be relatively large. For example, if the ISI of the first post-cursor $x_1$ is expected to be the largest, and the gain factor $g_1$ may be set to be the larger than any other $g_i$. On the other hand, if the ISI caused by a particular post-cursor $x_i$ is negligible, the ISI attenuation effect can be disabled by setting the corresponding gain factor $g_i$ to zero.

The DFE LMS 450 includes registers 451 storing the FIR post-cursor taps $x_1, \ldots, x_n$ which are n sliced data samples, the amplifiers 453A-453B having respective gain factors $g_1, \ldots, g_n$, and multipliers 454A-454B. The sliced error signal is amplified by the amplifiers 453A-453B by respective gain factors $g_1, \ldots, g_n$ and then multiplied with the set of post-cursors $x_1, \ldots, x_n$ by the multipliers 454A-454B. As a result, a set of correction step signals $d_1, \ldots, d_n$ are generated, for example $d_1 = g_1 \times e \times x_1$ and $d_n = g_n \times e \times x_n$. In some embodiments, to simplify the implementation of the programmable gain, each gain factor $g_i$ (i=1, . . . , n) can be implemented via $$g_i = 2^{-m}$$

where m is a programmable positive integer, such as 1, 2, 3, . . . . In this case, a shifter can be used, which is much simpler to implement than a multiplier.

The CTLE control logic 420 includes a register R 422 for storing the last correction control signal and an adder 423 for summing the correction step signals. The summed correction step signal d is added with the last stored correction control signal in the register 422 and then converted to an analog signal by the digital-analog-converter 421. The register 422 is updated with the sum result which is the digital correction control signal. The analog signal is used as the correction control signal to control the varactor voltage of the CTLE 410 or to control directly a set of transistor switches which select capacitors and/or resistors that set the zero frequency or a pole frequency. The resolution of the DAC 421 may be 6 to 8 bits. In order to prevent a large effect on the data in the tracking mode, a higher DAC resolution may be used. In a different embodiment, the control logic 420 does not include a DAC and the output from the register 422 directly controls an array of resistors and capacitors that set the CTLE transfer function.

By adapting the CTLE based on a combination of n post-cursor taps, the ISI ascribed to the multiple post-cursors can be attenuated in a fast speed.

Figure 4B:
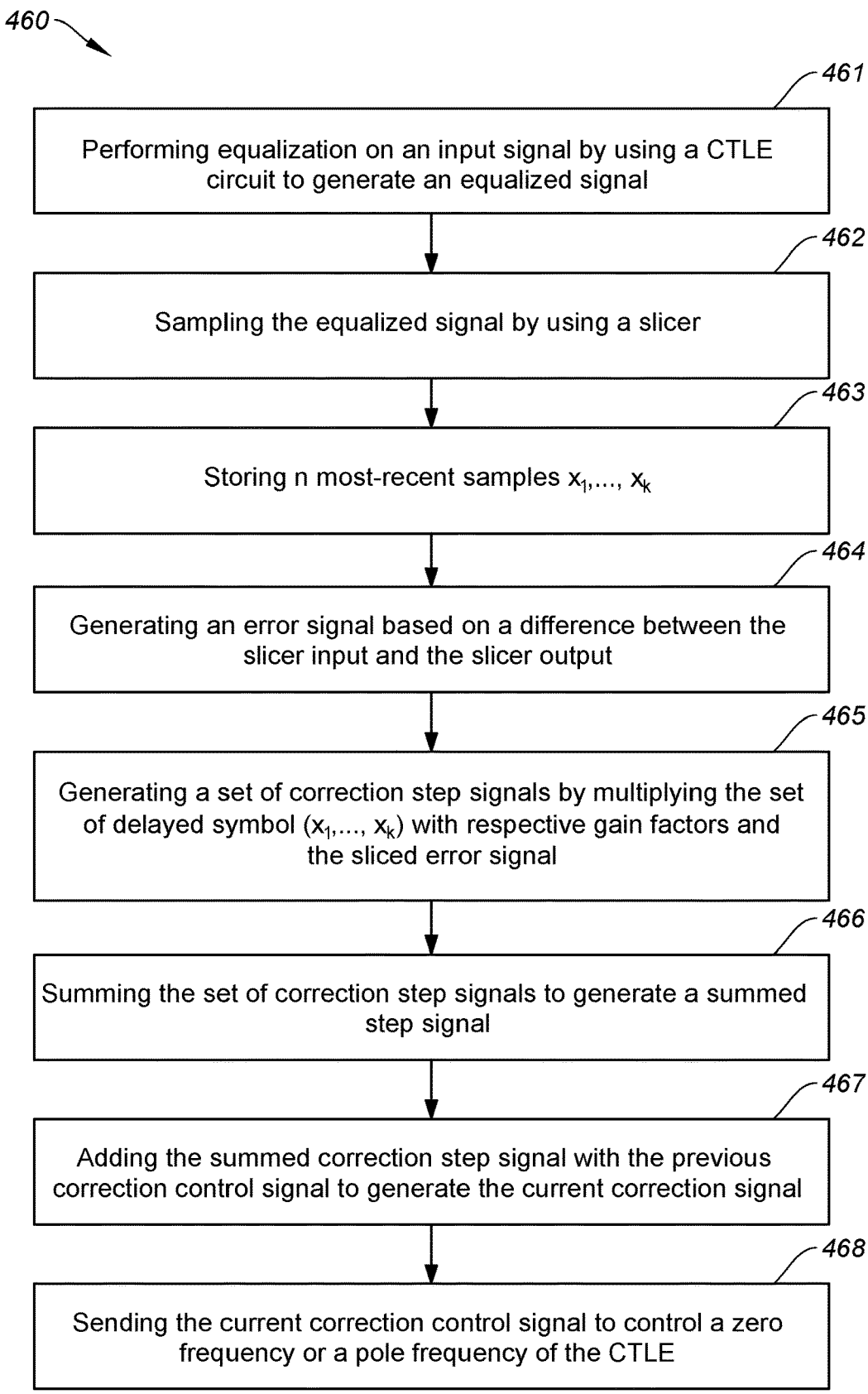
FIG. 4B is a flow chart depicting an exemplary process of adjusting a zero/pole frequency setting in an adaptive CTLE in accordance with another embodiment of the present disclosure.

FIG. 4B is a flow chart depicting an exemplary process 460 of adjusting a zero/pole frequency setting in an adaptive CTLE in accordance with another embodiment of the present disclosure. It will be appreciated that the present disclosure is not limited to any specific circuitry or logic configuration that can implement the process 460. For example, process 460 may be performed by the receiver 400 in FIG. 4A.

At 461, continuous time linear equalization is performed on a signal input to a CTLE circuit and an equalized signal is output. At 462, the equalized signal is sampled, e.g., by a slicer. At 463, a sequence of n sampled data $x_1, \ldots, x_n$ are stored in registers and in effect delayed as post-cursors with reference to the current data sample $x_0$. At 464, an error signal is generated based on a difference between the slicer input and slicer output. In some embodiments, the error signal may optionally be further sliced and used to generate correction control signal as follows.

At 465, a set of correction step signals are generated by multiplying the set of delayed sampled data $x_1, \ldots, x_n$ with the respective gain factors and the error signal. Some gain factors may be set to zero. At 466, all the correction step signals are summed. At 467, the correction step signal is summed with the last correction control signal to generate an updated correction signal, which is supplied to the CTLE to adjust corresponding components therein and thereby adjust the zero frequency or a pole frequency setting at 468. The foregoing process 461~468 is repeated for continuous adaptation of the CTLE zero frequency or pole frequency.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of signal processing at a receiver, the method comprising:
receiving an input signal through a communication channel;
using a Continuous Time Linear Equalizer (CTLE) to perform equalization on said input signal;
generating a set of samples of said input signal corresponding to a set of post-cursors;
selecting one or more samples from said set of samples;
generating a correction control signal based on said one or more samples;
feeding said correction signal to said CTLE to adjust a zero frequency or a pole frequency of said CTLE;
sending an output of said CTLE to a first slicer;
generating, with a second slicer, a slicer error signal based on a difference between an output and an input of said first slicer; and
generating said correction control signal based on said slicer error signal.

2. The method of claim 1, wherein said generating said correction control signal further comprises:
generating a digital correction signal based on said one or more samples; and
performing digital-to-analog conversion on said digital correction signal to generate said correction control signal.

3. The method of claim 1, wherein said generating said correction control signal further comprises generating a correction step signal by multiplying each of said one or more samples with said slicer error signal.

4. The method of claim 3, wherein said generating said correction step signal further comprises multiplying each of said one or more samples further with a respective gain factor.

5. The method of claim 3, wherein said generating said correction control signal further comprises adding said correction step signal with a stored correction control signal, and further comprising storing said correction control signal in a storage unit.

6. The method of claim 1, wherein said selecting comprises selecting one sample each update cycle from said set of samples.

7. The method of claim 1, wherein said generating said correction control signal further comprises:
multiplying each of said one or more samples with said slicer error and a gain factor to generate a correction step signal;
summing step correction signals of said one or more samples to generate a summed signal; and
generating said correction control signal based on said summed signal.

8. A device of processing signals transmitted via serial links, said device comprising:
a Continuous Time Linear Equalizer (CTLE) configured to perform equalization on an input signal;
storage units configured to store a set of delayed samples corresponding to a set of post-cursors;
control logic coupled to said CTLE and configured to:
select one or more samples from said set of delayed samples;
generate a correction control signal based on said one or more samples; and
feed said correction control signal to said CTLE to adjust a zero frequency or a pole frequency of said CTLE;
a first slicer configured to generate a sliced signal responsive to an output of said CTLE; and
a second slicer configured to generate a slicer error signal based on a difference between an output and an input of said first slicer;
wherein said correction control signal is generated based on said slicer error signal.

9. The device of claim 8, wherein said control logic comprises:
a multiplexer coupled to said control logic and configured to output a selected sample from said set of delayed samples; and
a multiplier configured to:
multiply said selected sample with said sliced error signal; and
output a step signal,
wherein said control logic is further configured to:
add said step signal with a previously stored correction control signal to generate said correction control signal; and
store said correction control signal in a storage unit.

10. The device of claim 8 further comprising a Decision Feedback Equalizer (DFE) coupled to an output of said CTLE and comprising said storage units.

11. The device of claim 8 further comprising:
multipliers configured to generate a set of step signals based on a set of gains, said set of delayed samples and said slicer error signal; and
a multiplexer coupled to said control logic and configured to alternately output a selected step signal from said set of step signals.

12. The device of claim 11, wherein said control logic further comprises:
a register configured to store a previously stored correction signal; and
a digital-to-analog converter (DAC) configured to convert a digital correction signal to said correction control signal, wherein said digital correction signal is generated based on said selected step signal and said previously stored correction control signal.

13. The device of claim 11, wherein said control logic is further configured to vary said set of gains.

14. The device of claim 8 further comprising:
multipliers configured to generate a set of step signals based on a set of gains, said set of delayed samples and said slicer error signal; and
an adder configured to sum said set of step signals into a summed signal, and wherein said control logic is configured to generate said correction control signal based on said summed signal.

15. A receiver configured to process signals transmitted via serial links, said receiver comprising:
a Continuous Time Linear Equalizer (CTLE) configured to perform equalization on an input signal;
storage units configured to store a set of delayed samples of said input signal corresponding to a set of post-cursors;
control logic coupled to said CTLE and configured to:
generate a correction control signal based on one or more delayed samples stored in said storage units; and
feed said correction control signal to said CTLE to adjust a zero frequency or a pole frequency of said CTLE;

a first slicer configured to generate a sliced signal responsive to an output of said CTLE; and a second slicer configured to generate a slicer error signal based on a difference between an output and an input of said first slicer;

wherein said control signal is configured to generate said correction signal based on one or more products of said slicer error signal and said one or more delayed samples.

16. The receiver of claim 15, wherein said control logic comprises:

a multiplexer configured to selectively output said one or more delayed samples;

a storage unit configured to store a previous correction control signal; and an adder configured to add an output of said multiplexer with said previous correction control signal.

17. The receiver of claim 15, wherein said control logic comprises:

a multiplexer coupled to said storage units and configured to selectively output a delayed sample from said set of delayed samples;

a multiplier configured to generate a product of said delayed sample and said slicer signal;

a storage unit configured to store a previous correction control signal; and an adder configured to add and output of said multiplexer with said previous correction control signal.

18. The receiver of claim 15, wherein said control logic comprises:

a set of multipliers configured to generate a set of products of said set of delayed samples with said slicer error signal and a set of gain factors; and an adder configured to sum said set of products to generate a summed signal;

wherein said control logic is further configured to generate said correction control signal based said summed signal.

* * * * *